Dec. 15, 1925.
C. B. PARSONS
BUMPER
Filed April 28, 1924
1,565,587
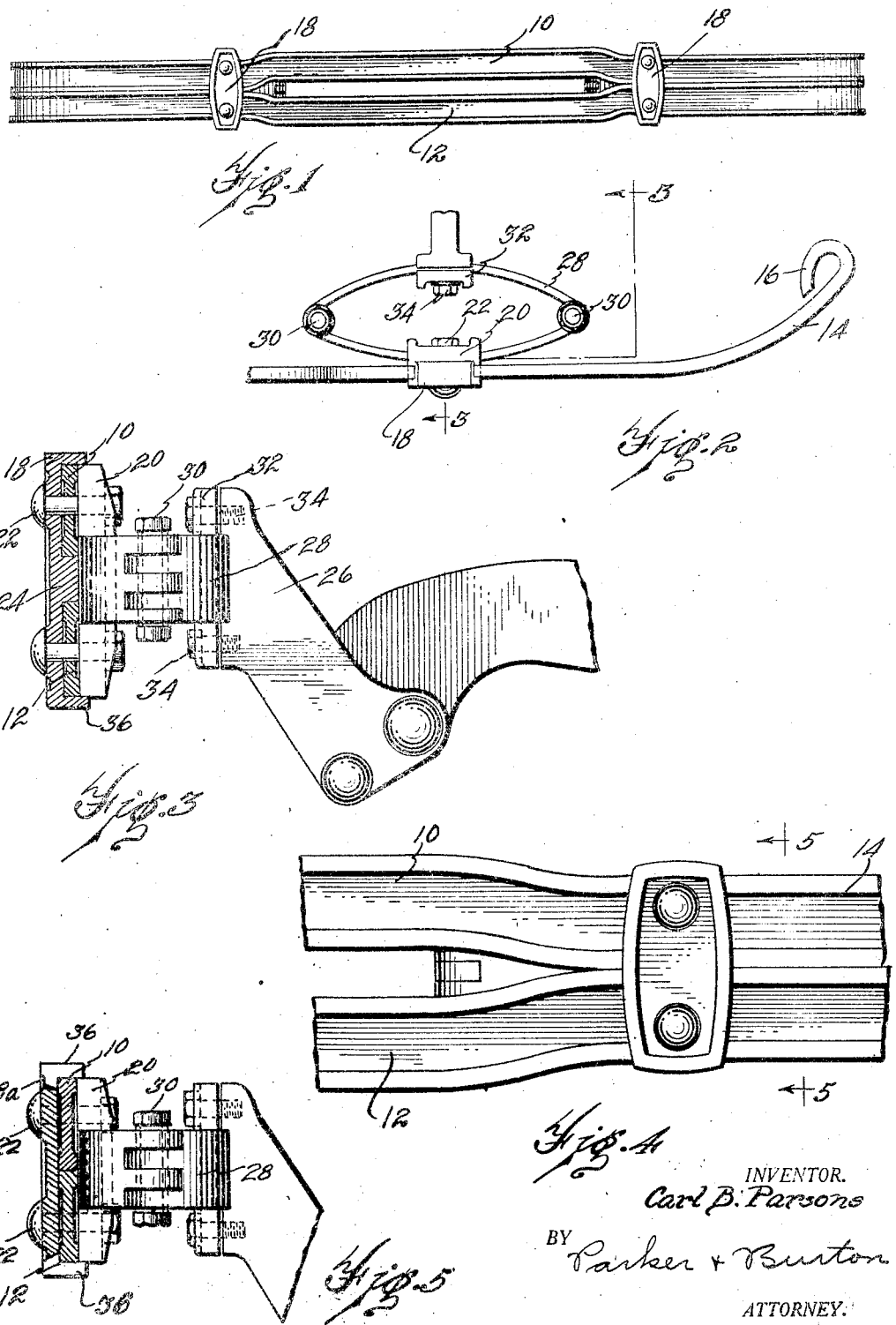
INVENTOR.
Carl B. Parsons
BY Parker + Burton
ATTORNEY.

Patented Dec. 15, 1925.

1,565,587

UNITED STATES PATENT OFFICE.

CARL B. PARSONS, OF DETROIT, MICHIGAN, ASSIGNOR TO MOTOR PRODUCTS CORPORATION, OF DETROIT, MICHIGAN, A CORPORATION OF NEW YORK.

BUMPER.

Application filed April 28, 1924. Serial No. 709,374.

*To all whom it may concern:*

Be it known that I, CARL B. PARSONS, a citizen of the United States, residing at Detroit, county of Wayne, State of Michigan, have invented a certain new and useful Improvement in Bumpers, and declare the following to be a full, clear, and exact description of the same, such as will enable others skilled in the art to which it pertains to make and use the same, reference being had to the accompanying drawings, which form a part of this specification.

My invention relates to an improvement in bumpers and particularly to bumpers intended for use at the front and the rear end of an automobile.

The object is to provide a light, strong bumper possessing a pleasing appearance and having the maximum capacity to absorb the shock of impact.

My invention consists of a bumper having a plurality of impact members suitably supported at the ends by elliptic springs.

A meritorious feature is the employment of spaced-apart impact members, the end portions of which are turned toward each other and disposed one above the other in substantially the same vertical plane in abutting relationship, which end portions are fastened together and provided with resilient bumper supports extending rearwardly therefrom.

The above objects and other important advantages will appear more fully in the following specification and appended claims.

In the drawings,—

Figure 1 is a front elevation of a bumper built in accordance with my invention.

Fig. 2 is a fragmentary plan view of an end of the bumper shown in Fig. 1.

Fig. 3 is a view partly in plan and partly in section taken on line 3—3, Fig. 2.

Fig. 4 is a fragmentary front elevation of an end portion of my invention.

Fig. 5 is a view partly in plan and partly in section taken on line 5—5, Fig. 4.

I provide impact members 10 and 12 which are here shown as being of channel construction, the channel being disposed outwardly. These impact members are held in spaced-apart relationship and disposed one above the other in substantially the same vertical plane. I prefer to bend the ends of the impact members rearwardly as at 14 and each end portion may be turned over as at 16 forming a loop. The rearwardly turned end portions of the impact members are likewise disposed in the same vertical plane.

The two impact members are secured together by suitable clamps. Two of these clamps are here shown and consist of a front plate 18, a rear plate 20 and bolts 22 which pass through the front and rear plates and through the respective impact members.

The end portions 14 of the spaced-apart impact bars are bent toward each other into abutting relationship, as appears in Fig. 4. The clamp 18 which secures the impact bars together is fastened to the rear clamp 20 by suitable bolts 22 which extend through both clamp members and through the impact bars 10 and 12. This front clamp member has turned-over ends 36. The elliptic spring supports are clamped against the in-turned abutting ends of the impact bars over the joint therebetween but spaced from the ends of the bars.

Bumper supports are provided one for each end of the bumper and comprise brackets 26 which may be suitably secured to the car frame and elliptic springs 28 each comprising two spring members secured together at their ends by pins 30. One of these spring members is secured to the bracket 26 by a clamp 32 having screws 34 extending therethrough to engage the bracket. The other spring member is fastened to the impact members, being embraced by the rear clamp member 20 and having a bearing against both the impact members over the joint therebetween, as shown in Figs. 3 and 5.

What I claim is:

1. In a bumper, spaced-apart impact members having rearwardly bent end portions turned toward each other into abutting relationship and fastened together, and an elliptic spring support for each end of said impact members extending lengthwise thereof and secured thereover the gap therebetween.

2. In a bumper, a pair of channel impact members held in spaced-apart relationship and having their ends turned toward each other and disposed one above the other in substantially the same vertical plane in abutting relationship, and an elliptic spring support for each end of said bumper secured to the abutting end portions of said impact members and rearwardly of the point of contact therebetween and spaced from the ends thereof.

In testimony whereof, I sign this specification.

CARL B. PARSONS.